3,067,810
Patented Dec. 11, 1962

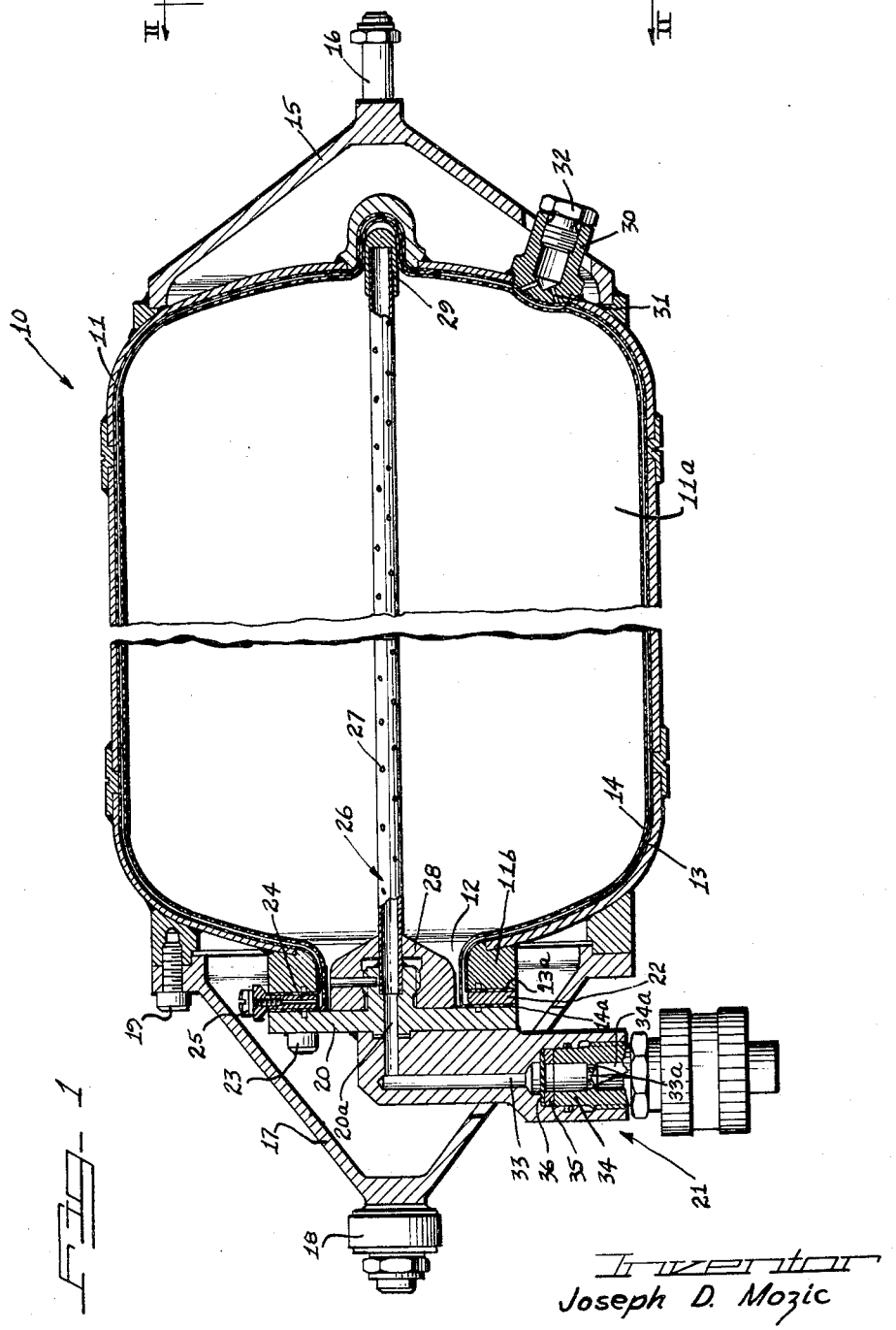

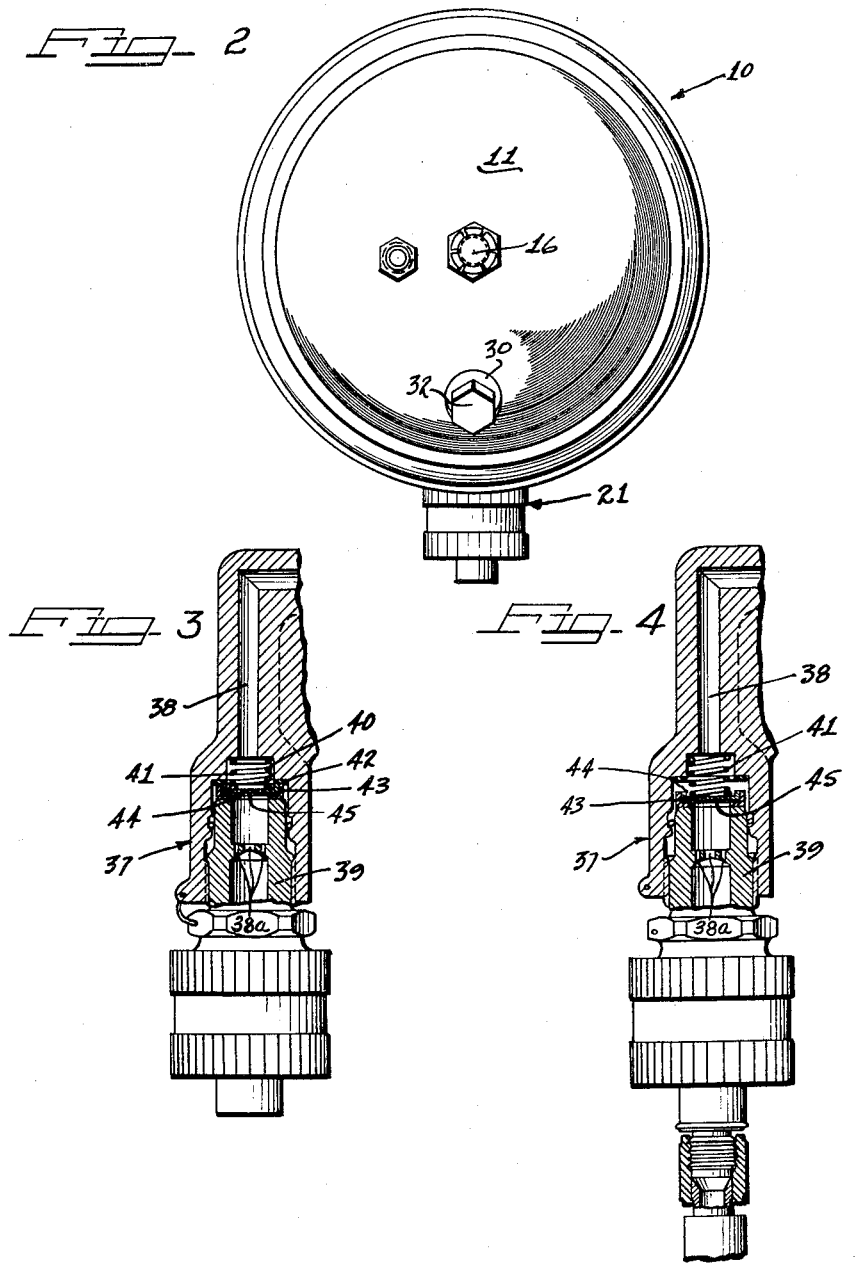

3,067,810
BLADDER FUEL TANK
Joseph D. Mozic, Cleveland, Ohio, assignor to Thompson Ramo Wooldridge Inc., Cleveland, Ohio, a corporation of Ohio
Filed Mar. 21, 1960, Ser. No. 16,419
5 Claims. (Cl. 158—50.1)

The present invention relates to improvements and devices for storing and feeding reactive liquids such as fuel and particularly to an improved expulsion fuel tank assembly for safely storing fuel over a long period of time and using pressurized gas such as air for expelling the fuel when the container is used.

The invention contemplates the provision of a container well suited for use in auxiliary power systems for missiles. In these containers the fuel, such as a monopropellant-anhydrous hydrazine is placed in individual containers for shipment and storage for instant use and pressurized air ordinarily is used to start and maintain the flow of fuel into a combustion chamber. The individual containers are expendable and must be reasonable in cost and must be safe for storage and use. The expulsion mechanism must necessarily be completely reliable and withstand shocks of shipping and handling and temperature changes.

Accordingly, an object of the present invention is to provide an improved storage and supply container for reactive liquids such as hydrazine which can be stored over long periods of time without damage from the reactive fuel.

Another object of the invention is the provision of an improved expulsion fuel tank capable of accommodating long term confinement of the chemically active fuel with a minimum possibility of seepage or leakage and over a wide temperature range on the order of —65° to 165° F.

Another object of the invention is to provide a fuel storage and expulsion tank which is of relatively light weight and is useful in aircraft and missiles but is also sufficiently sturdy to be used as its own storage tank and is sufficiently safe to obtain approval by Federal agencies and shippers for use as a shipping container.

A further object of the invention is the provision of an expulsion and storage tank wherein a stored fluid is expelled by a pressurizing gas with no contact between the gas and the fluid and a very high expulsion efficiency is achieved and approximately 99% of the stored fluid can be expelled.

In obtaining the above objectives a feature of the invention contemplates the provision of a container with an elongated perforated tube extending therethrough and communicating with a discharge opening. Lining the container are first and second expulsion bladders and a fitting communicates between the bladders for introduction of an inhibiting material such as water to neutralize the corrosive properties of the contained fuel. Another feature is the provision of a protective Teflon bumper to promote favorable bladder folding when an expulsion gas is introduced into the container to collapse the bladders. A further feature is the provision of a rupturable disc in the outlet passage, which seals the container during storage and is arranged to permit filling the container through the same expulsion passage.

Other features and objectives will become more apparent with the teaching of the principles of the invention in connection with the disclosure of the preferred embodiments thereof in the specification, claims and drawings, in which:

FIGURE 1 is a vertical sectional view taken through the axis of a fuel tank assembly constructed in accordance with the principles of the present invention;

FIGURE 2 is an end elevational view taken from the right end of FIGURE 1 substantially along line II—II;

FIGURE 3 is an enlarged detailed sectional view taken through a discharge fitting of an alternate design showing the parts in position during storage condition; and, FIGURE 4 is another view of the mechanism of FIGURE 3 but showing the parts in position for filling the container.

As shown on the drawings:

As illustrated in FIGURE 1, an expulsion fuel tank assembly 10 provides a device for storage and for feeding a reactive liquid fuel such as hydrazine. The assembly is capable of storing the fuel over long periods of time and is well adapted to shipping the fuel by conventional means of transportation. At the time of use, the tank assembly is connected to a combustor and a pressurized source of expulsion fluid such as air as directed into the assembly to expel the fuel.

More particularly, the tank assembly includes a metal outer container 11 open at one end 12, but otherwise closed.

Lining the container are a first outer expulsion bladder 13 of a flexible material and a second inner expulsion bladder 14 also of a flexible material. The bladders may be provided of a material which is inert to the fuel which will fill the cavity 11a within the container and may be of a flexible somewhat elastic material such as butyl rubber. In some instances a material such as polytetrafluoroethylene may be employed.

At the ends of the container are suitably secured brackets 15 and 17 carrying trunnion supports 16 and 18 for pivotally supporting the fuel container. The brackets are suitably attached to the container such as by welding or by bolts 19.

At the open end 12 of the container is attached a cap 20 and the end of the container has attached thereto an annular collar 11b to receive bolts 23 for securing the cap. The cap is provided with a passage 20a therethrough which communicates with a filling and expulsion passage in a filling and expulsion fitting 21 which extends radially outwardly from the container for attachment to a conduit or line for supplying the fuel to a combustor, or to a different line for filling the container.

The bladders are open at one end and the edges of the open end are turned outwardly to form gasket flanges 13a and 14a. Between the layers is an annular ring 22 and the cap 20 clamps the assembled elements together to provide a seal for the container end.

A fitting 24 extends axially through the ring 22 and has a passage communicating between the bladders 13 and 14 for the introduction of an inhibiting fluid such as water between the bladders to neutralize the corrosive or other undesirable properties of the fuel. A threaded closing screw 25 closes the passage through the fitting 24.

Extending axially through the center of the container is a tube 26 with perforations 27 therein. The interior of the tube communicates with the passage 20a through the cap for expelling fuel when the container is to be emptied. The discharge end of the tube is mounted in the cap and is supported by a flanged member 28 which is attached to the cap 20.

At the other end of the tube 26 is a protective bumper 29 which promotes a favorable bladder folding when the bladder is collapsed to expel the fuel. The bumper is telescopically slid over the open end of the tube and is formed of a smooth protective material, preferably polytetrafluoroethylene.

The container is provided with an air pressure bladder-collapsing fitting 30 having openings 31 therethrough communicating with the inside of the container outside of the outer bladder 13. The fitting 30 has a removable plug 32 for connecting a pressure air line to collapse the bladder and expel the fuel.

The expulsion or discharge fitting 21 has a filling and discharge passage 33 therethrough. Threadably inserted into the end of the fitting is a hollow connector plug 34 with small passages 33a drilled through a wall across the passage 34a therethrough forming a continuation of passage 33, and with an annular basket 35 at its base which holds a rupturable disc or diaphragm 36 across the passage 33. The diaphragm seals the passage to prevent escape of the contents of the container to prevent air from getting into the container during normal storage. When the container is to be filled, the plug 34 may be threaded out of the fitting 21 to remove the diaphragm 36 and the container can then be filled with fuel, after which the plug and diaphragm are replaced.

FIGURES 3 and 4 illustrate another form of fitting 37 with a passage 38 therethrough also having small passages 38a drilled through a wall across the passage 38.

A removable connector plug 39 threads into the fitting 37. Within the fitting the passage 38 is enlarged to provide a chamber 40 for a coil compression spring 41 which urges outwardly against a rupture disc cartridge assembly that includes an outer disc holder 43, an inner disc holder 44 and a rupture disc or diaphragm 45. The outer disc holder 45 has an annular opening through the center and the inner disc holder is perforated to provide support for the disc in the direction of flow when the container is filled with fuel. FIGURE 3 shows the cartridge pressed against an annular polytetrafluoroethylene gasket 42. The parts are in this position during storage and the container is sealed.

When the container is to be filled, the parts are in the position of FIGURE 4. For preparation the plug 39 is threaded outwardly from the position of FIGURE 3 to FIGURE 4 and the rupture disc cartridge is pushed outwardly by the spring 41 to follow the plug 39. As fuel is forced inwardly through the hollow plug, the pressure of fuel acting on the upper surface of the disc or diaphragm 45 will move it in the direction of flow against the spring 41 so that fuel can flow around the edges of the outer disc support 43.

In operation, with the arrangement of FIGURE 1, the operator will remove the plug 34 for filling the container 11, and with the arrangement of FIGURES 3 and 4, the plug 39 will merely be loosened. When the container is filled the plug will be tightened and the rupture disc 36 of FIGURE 1, or the rupture disc 45 of FIGURES 3 and 4 will seal the container. For expelling the contents a pressure air line will be connected to the fitting 30 and the bladders with the inert material therebetween will be collapsed against the perforated tube 26 to expel the fuel.

Thus it will be seen that I have provided an improved fuel tank assembly which meets the objectives and advantages hereinbefore set forth. The structure is reliable in operation, relatively inexpensive to manufacture, and is reliable.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. An expulsion fuel tank assembly comprising a container for fuel provided with a discharge opening, an elongated perforated tube extending through the container communicating with said opening, a first expulsion bladder of a flexible material lining the container, a second expulsion bladder within said first bladder and separate from the first bladder for containing an inert material therebetween to mix with fuel which may leak through the second bladder, and a fitting on the container communicating with the container outside of the bladders for accommodating flow of a pressurized expulsion fluid.

2. An expulsion fuel tank assembly comprising a container for fuel provided with a discharge opening, a first expulsion bladder of a flexible material lining the container, a second expulsion bladder within said first bladder, a fitting on the container communicating with the container outside of the bladders for accommodating flow of a pressurized expulsion fluid, and means on the container communicating with the space between said first and second bladders for introducing an inhibiting fluid to neutralize the corrosive properties of the fuel within the container which may leak through the second bladder to mix with the inhibiting fluid.

3. An expulsion fuel tank assembly comprising a container for fuel provided with a discharge opening, a first expulsion bladder of a flexible material lining the container, a second expulsion bladder within said first bladder and separate from the first bladder for containing an inert liquid therebetween to mix with fuel which may leak through said second bladder, and a fitting on the container communicating with the container outside of the first bladder for accommodating a flow of pressurized expulsion fluid to collapse the bladders.

4. An expulsion fuel tank assembly comprising a closed container for fuel, means for expelling the fuel from the container, a filling and discharge fitting mounted on the container and having a flow passage therethrough communicating with the interior of the container and providing a sole access to fuel in the container, and a rupturable disc positioned across said passage and movable to a sealing position downstream with respect to flow from the container for sealing the container and blocking flow through the passage and movable to a release position downstream with respect to flow into the container in which the passage is open for filling the container, the pressure of fuel in said container holding said disc in said sealing position, the pressure of flow into the container moving the disc to release position for accommodating filling of the container.

5. An expulsion fuel tank assembly comprising a closed container for fuel, a filling and discharge fitting mounted on the container and having a flow passage therethrough communicating with the interior of the container and providing the sole access to fuel in the container, a rupturable disc positioned across said passage for sealing the container and blocking flow through the passage, said disc movable to a first position downstream with respect to flow out of the container wherein said passage is blocked and to a second position downstream with respect to flow into the container wherein said passage is open, means resiliently holding said disc in said first position, and a disc opening surface facing upstream with respect to filling flow into the container so that the disc will be moved to said second position against said resilient means with the pressure of fuel forced into the container.

References Cited in the file of this patent

UNITED STATES PATENTS

| | | |
|---|---|---|
| 1,127,128 | Walter | Feb. 2, 1915 |
| 1,789,998 | Blaskewitz | Jan. 27, 1931 |
| 1,898,899 | Rowley | Feb. 12, 1933 |
| 2,106,176 | Huffman et al. | Jan. 25, 1938 |
| 2,183,208 | Allen et al. | Dec. 12, 1939 |
| 2,263,840 | Franck | Nov. 25, 1941 |
| 2,402,826 | Lubbock | June 25, 1946 |
| 2,542,929 | Kimball | Feb. 20, 1951 |
| 2,744,662 | Smith et al. | May 8, 1956 |
| 2,980,177 | Glasson | Apr. 18, 1961 |

FOREIGN PATENTS

| | | |
|---|---|---|
| 5,033 | Great Britain | Mar. 11, 1898 |